United States Patent [19]

Smith

[11] 3,851,890
[45] Dec. 3, 1974

[54] QUICK CHANGE SPINDLE ADAPTER AND NUT ASSEMBLY

[75] Inventor: Theodore M. Smith, Detroit, Mich.

[73] Assignee: Theodore M. Smith, Trust, Lucille G. Smith, and Theodore M. Smith (trustees)

[22] Filed: Apr. 21, 1972

[21] Appl. No.: 246,269

[52] U.S. Cl. .................. 279/75, 279/1 B, 279/82
[51] Int. Cl. ............................................. B23b 31/04
[58] Field of Search .......... 279/1 B, 75, 82, 1 E, 29, 279/30, 76, 81, 89

[56] References Cited
UNITED STATES PATENTS

| | | | |
|---|---|---|---|
| 3,672,692 | 6/1972 | Fauth | 279/1 B X |
| 3,674,281 | 7/1972 | Hedrick | 279/1 B X |
| 3,684,302 | 8/1972 | Herman | 279/1 B X |
| 3,658,351 | 4/1972 | Benjamin et al. | 279/1 B |
| 3,529,842 | 9/1970 | Benjamin et al. | 279/30 |

FOREIGN PATENTS OR APPLICATIONS

| | | | |
|---|---|---|---|
| 342,678 | 1/1931 | Great Britain | 279/75 |
| 877,753 | 12/1942 | France | 279/82 |

*Primary Examiner*—Andrew R. Juhasz
*Assistant Examiner*—Z. R. Bilinsky
*Attorney, Agent, or Firm*—Robert A. Sloman

[57] ABSTRACT

A quick change adapter for a power rotated spindle to removably receive a tool holder which includes a cylindrical body mounted on and projecting forwardly of the spindle. A forwardly retractable spring biased control sleeve is movably mounted on said body and an internally threaded nut is adapted to threadedly receive a tool holder which is removably projected into said body and bears against said spindle and wherein a series of spaced balls are nested in said body with portions of the balls extending radially outward operatively engaged by said sleeve and with inner portions of said balls retainingly engaging said nut. The control sleeve may be releasably locked in retracted position.

10 Claims, 6 Drawing Figures

PATENTED DEC 3 1974

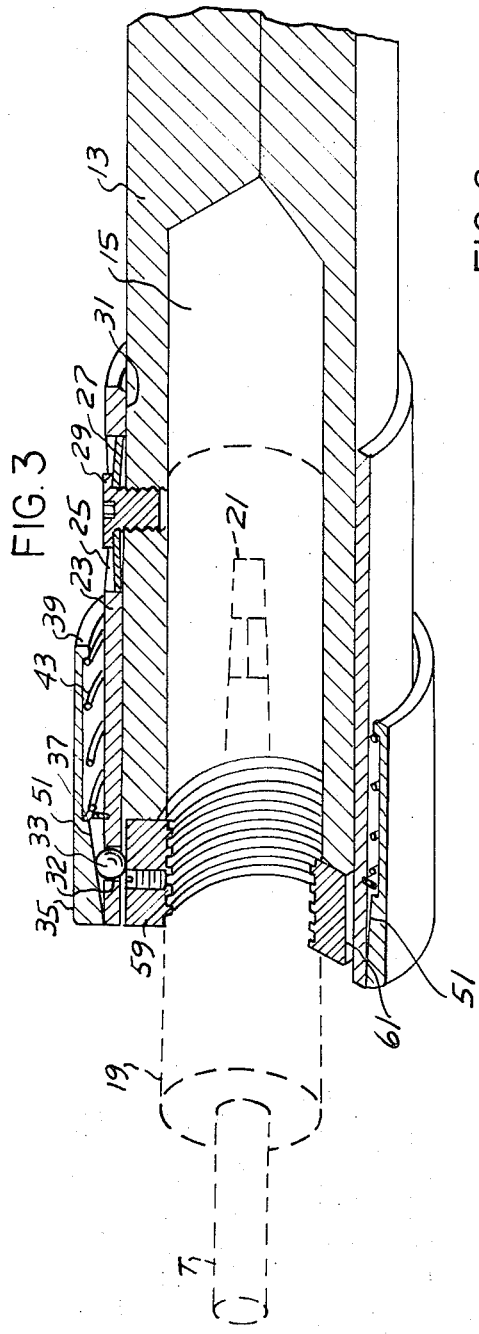
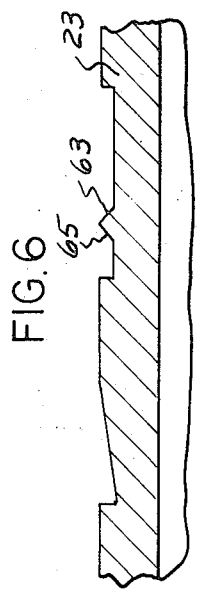
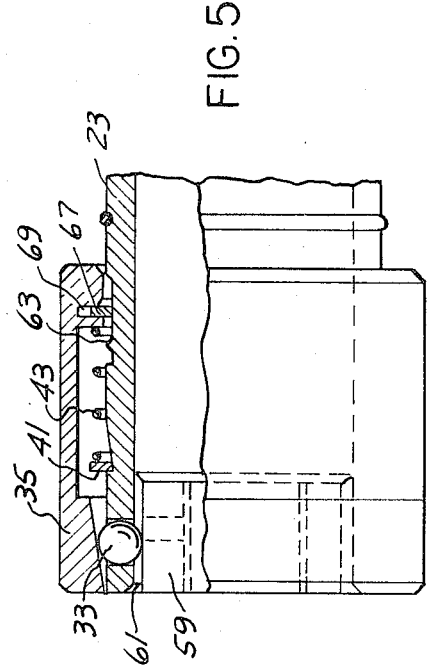

QUICK CHANGE SPINDLE ADAPTER AND NUT ASSEMBLY

BACKGROUND OF THE INVENTION

The present invention is an improvement in the quick change spindle adapter of my co-pending U.S. Pat. application, Ser. No. 163,946, filed July 19, 1971. One of the difficulties sought to be overcomed in the present application was the problem of preventing accidental disengagement of the nut from its retaining balls under some conditions as where transverse eccentric forces applied to the tool holder either by the set screw or by other factors has a tendency to cause such transverse radial tilting movements of the nut with respect to the balls that under some conditions, there is the chance that the nut may be accidentally dislodged from said balls.

Furthermore, in the construction shown in said co-pending application with the outer end portion of the body internally flanged so as to bear against the end of the spindle precise dimensioning was required in order that the cap screw would properly pass through its washer and into the threaded bore 28 of the spindle holding the body in position.

RELATED APPLICATION

In my co-pending application, Ser. No. 225,872 filed Feb. 14, 1972, a two-piece nut assembly was employed. The present application includes a simplified nut construction.

BRIEF DESCRIPTION

Accordingly, one of the objects of the present invention is to provide a body mounted upon and secured to the spindle and which projects forwardly thereof to removably receive the nut. A straight-through bore for the body is provided to avoid the difficulty of proper location of the cap screw aperture for securing the body to the spindle.

It is another object to provide an improved nut assembly which is so designed as to prevent its accidental dislodgement from the spindle carrying body. For this purpose the bore of said body is uniform and straight through. The nut seats directly on the forward end of the spindle. In the present invention, any outward thrust upon the tool or the tool holder is counteracted by increased retaining forces acting through the elongated binding angle of the retractable sleeve, retaining balls and the tool holder nut and resulting in increased holding pressure upon the nut for tightly anchoring the same against outward displacement.

It is a further object to provide an improved nut assembly which includes a body internally threaded to receive the tool holder and which has upon its exterior a preformed surface which is retainingly engaged by the balls carried by the body and pressed inwardly by the retractible sleeve in such fashion that any transverse tilting movements of the nut out of concentricity is ineffective to disengage the nut from the holding mechanism. This accomplishes the main objective of preventing accidental forward dislodgement of the nut assembly from the spindle body sleeve combination. These and other objects will be seen from the following specification and claims in conjunction with the appended drawing in which:

FIG. 3 is a view similar to FIG. 1, illustrating a modification.

FIG. 4 is a view similar to FIG. 2 of the modification.

FIG. 5 is a fragmentary broken away sectional view of a modified control sleeve.

FIG. 6 is a fragmentary enlargement of a part thereof.

It will be understood that the above drawings merely illustrate a preferred embodiment of the invention, and that other embodiments are contemplated within the scope of the claims hereafter set forth.

DETAILED DESCRIPTION

Figure 1:
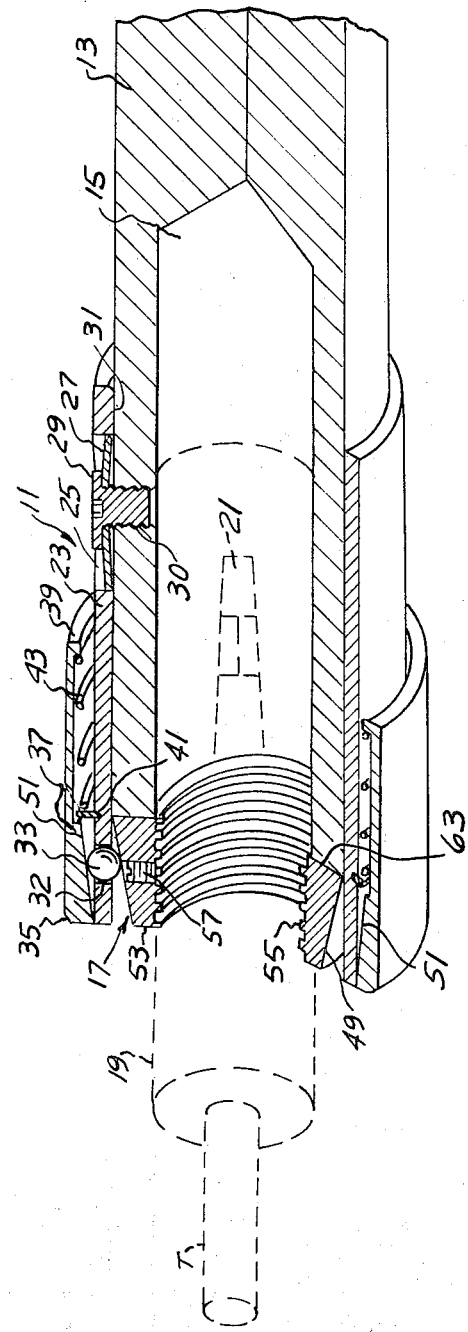
FIG. 1 is a schematic front perspective partly broken away and sectional longitudinal view of the present quick change spindle adapter with improved nut assembly.
Figure 2:
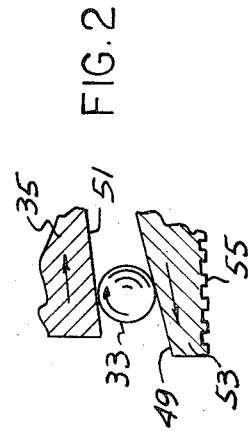
FIG. 2 is a schematic fragmentary illustration showing the forces tending to retain the tool holder nut assembly against accidental outward release movement.

Referring to the drawing, FIGS. 1 and 2, the quick change spindle adapter 11 includes the power rotated spindle 13 fragmentarily shown and broken away for illustration which has an internal bore 15, nut assembly 17 adapted to threadedly receive tool holder 19 having a tapered or other bore 21 to removably receive the tool T which may be a bore, a counterbore, a drill, a tap or other cutting tool.

Elongated cylindrical body 23 which is mounted on and around the spindle has a uniform bore 31 and projects forwardly of said spindle to cooperatively receive the nut assembly 17.

Transverse elongated slot 25 is formed through body 23 and is adapted to receive the flexible locking washer 27 centrally apertured to receive cap screw 29. The latter threadedly extends into the radial bore 30 within said spindle. This construction provides a convenient means for anchoring the body to the spindle. Said washer may be oblong or round.

Said body at its forward end has a series of spaced radial apertures 32 within which are movably positioned a corresponding series of balls 33. These balls cooperate with sleeve 35 and are adapted to retainingly engage the nut assembly 17.

Sleeve 35 includes a pair of interior longitudinally spaced shoulders 39 and 37. Split ring 41 is mounted upon body 23 within a corresponding annular slot therein and is adapted to retainingly engage shoulder 37.

Coiled compression spring 43 surrounds said body, at one end engages the ring 41 and at its opposite end retainingly engages the internal flange 39 of said sleeve to bias the sleeve to the position shown in FIG. 1 relative to said body. The sleeve is adapted for manual forward movement relative to said body for disengaging the nut assembly.

Said sleeve has an interior annular rearwardly and outwardly tapered portion 51 adapted for cooperative registry with balls 33.

NUT ASSEMBLY

The present adjustment nut assembly 17 includes an elongated nut body 53 internally threaded at 55 to threadedly receive and engage and retain tool holder 19. Radial set screw 57 extends into said body and is adapted for operative retaining registry with tool holder 19.

The nut body has an external annular rearwardly and outwardly tapered face 49 adapted for cooperative retaining registry with balls 33.

The interior rearwarldy tapered wall 51 of sleeve 35 provides a binding angle with respect to tapered nut wall 49 and balls 33 therebetween.

Accordingly, with the arrangement of the parts shown in FIG. 1, the internal tapered portion 51 of said sleeve is in cooperative engaging registry with balls 33 which, in turn, retainingly register with the external taper 49 of said nut.

It is noted from FIG. 1 as well as in the schematic illustration, FIG. 2, that the tapered surfaces 49 and 51 may be parallel for proper operation, but in the illustrative embodiment, slightly converge towards each other rearwardly for improved and increased holding action. Body 53 of the nut assembly 17 at its inner end seats as at 63 upon the outer end of spindle 13.

As shown in FIG. 2, any outward thrust upon the tool or tool holder 19 with corresponding thrusts upon the nut body 53 causes the balls 33 to rotate clockwise. Ball 33 frictionally engaging the outer sleeve 35 tends to force the same axially inward as shown by the arrow. This tends to increase its retaining force on the balls to more tightly anchor the nut against such displacement.

Any forward force or motion on the nut body 53 thus causes the balls to roll inwardly for further anchoring of the nut assembly. Since the center distance between the two tapered surfaces 49–51 are slightly reduced in a rearward direction, there is provided an increased holding force for anchoring and securing the nut against accidental displacement from body 23.

In the present construction, the binding effect of sleeve surface 51 is not effected by any eccentricity or radial tilting movements of the nut body. This is possible because length of surface 51 is such that any transverse tilting movements of the nut with respect to the longitudinal axis of the spindle will not cause disengagement of the nut, or accidental removal of same.

In the older types of construction, nut eccentricity created due to a loose or sloppy fit would result in uneven forces on the balls 33 so that there was a chance of accidental dislodgement of the nut with respect to the body or a failure of the balls to anchor and retain the nut and associated tool holder.

In the present construction even if there is some wobbling or eccentricity of the axis of the nut, this does not effect the sleeve and ball holding action. Thus the pressure upon the balls exerted through the sleeve are continuous holding pressures and there will be no accidental dislodgement of the tool holder and nut from the spindle body assembly.

MODIFICATION

Referring to FIGS. 3 and 4, the assembly shown therein is substantially the same except that the nut body 59 is cylindrical in form and, thus, has an outer annular surface 61, FIGS. 3 and 4, which are adapted for cooperative registry with the spaced balls 33 which are interposed between the annular or cylindrical surface 61 and the binding angle or rearwardly outwardly tapered inclined surface 51 of the retractable sleeve 35.

The same function occurs here as in the structure above defined in detail with respect to FIGS. 1 and 2; namely, that any tendency for the nut assembly 59 to move forwardly outward towards an accidental disengagement with the holding body 23 and sleeve 35 is restricted and restrained by virtue of the angular relationship between surfaces 61 and 51. In this situation it appears that any tendancy of outward movement of the nut assembly 59 will cause a corresponding clockwise rotation of the balls 33 as shown in FIG. 4 to grip with increased friction the inner inclined surface 51 of the sleeve 35.

MODIFICATION

FIGS. 5 and 6 illustrate a modified construction with respect to the outer wall of the body 23 and the retractable sleeve 35.

In the construction shown in FIGS. 1 and 3, in order to permit removal of the nut assembly and the connected tool holder from the body 23, it was necessary to manually retract the sleeve 35 and hold the same against the compressive action of the internal coil spring 43. Thus, the sleeve had to be manually held so retracted until the tool was removed or until another tool was replaced by the insertion of the nut assembly back within the outer end of the body 23.

In the modification shown in FIGS. 5 and 6, there is provided a mechanism by which once the sleeve has been retracted to a certain point, it will retainingly lock in retracted position until manually returned to normal position.

For this purpose there is provided upon the exterior surface of the body within the area housing the spring of the cam retainer 63–65 shown on an enlarged scale in FIG. 6.

An annular but split compressive ring 67 is movably nested within the internal annular slot 69 within said sleeve as shown in FIG. 5 so that as the sleeve 35 is manually retracted, the split ring 67 will cam over the inclined surfaces 63–65 with the split ring temporarily expanding as it rides over such cam surfaces and thereafter, retainingly engaging the outer annular cam surface 65 to, thus, hold the sleeve in retracted position against the action of the spring 43.

Accordingly, so retracted, the nut assembly may be easily removed or inserted without manual engagement of the said retracted sleeve. Just as soon as the nut has been returned to the position shown in FIGS. 1 and 3, a manual rearward force upon the sleeve 35 will cause a reverse action with the split ring 67 expanding as it is cammed or pushed rearwardly over the cam surface 65 returning to the position rearwardly of cam surface 63.

Accordingly, there is thus provided an improvement in the body and sleeve relationship by which, once the sleeve has been retracted, it will stay retracted until manually returned with a small returning camming force.

Having described my invention, reference should now be had to the following claims.

I claim:

1. A quick change adapter for a power rotated spindle having a bore adapted to receive a tool holder;
    a cylindrical body having a uniform bore mounted upon and secured to said spindle and projecting forwardly thereof;
    a forwardly retractable spring biased sleeve movably mounted on said body and including a rearwardly and outwardly tapered inner wall portion;
    and an internally threaded nut adapted to threadedly receive said tool holder, projected into said body and bearing against said spindle; its outer surface being straight axially;

there being a series of spaced balls nested in said body; portions of said balls projected radially inward retainingly engaging said nut and projected radially outward for operative engagement with said tapered inner wall portion, the tapered inner wall of the sleeve converging relative to the nut surface providing a cooperating wedging action of the balls between the nut surface and the sleeve inner wall for the purpose of anchoring said nut and tool holder within said body, and whereby forward manual retraction of said sleeve releases said balls facilitating assembly to and manual removal of said tool holder and nut from said body.

2. In the quick change adapter of claim 1, said nut including a body which has an annular and rearwardly outwardly tapered surface for cooperative retaining registry with said balls.

3. In the quick change adapter of claim 1, said nut including a body having an annular cylindrical surface for cooperative retaining registry with said balls.

4. In the quick change adapter of claim 2, the inner wall portion of said sleeve converging rearwardly towards the external wall of said nut body.

5. In the quick change adapter of claim 3, the inner wall portion of said sleeve converging forwardly towards the external wall of said nut body.

6. The combination with a power driven spindle having a bore, a cylindrical body of uniform bore throughout its length secured thereon and projecting forwardly thereof, a retractable spring biased sleeve on the body and balls on said body operably engaged by said sleeve, of a nut assembly adapted to threadably receive a tool holder, projected into said body and bearing against said spindle; portions of said balls being projected radially inward retainingly engaging said nut assembly, whereby forward manual retraction of said sleeve releases said balls facilitating assembly and manual removal of said nut assembly, said nut assembly including a body which is internally threaded, said body being free for radial eccentric movements relative to said body; the exterior surface of said nut body being tapered rearwardly and outwardly the tapered inner wall of the sleeve converging relative to the nut surface providing a cooperating wedging action of the balls between the nut surface and the sleeve inner wall for the purpose of anchoring said nut and tool holder within said body.

7. In the adapter of claim 8, said cam surface being annular.

8. A quick change adapter for a power rotated spindle having a bore adapted to receive a tool holder;

a cylindrical body having a uniform bore mounted upon and secured to said spindle and projecting forwardly thereof;

a forwardly retractable spring biased sleeve movably mounted on said body and including a rearwardly and outwardly tapered inner wall portion;

and an internally threaded nut adapted to threadedly receive said tool holder, projected into said body and bearing against said spindle;

there being a series of spaced balls nested in said body; portions of said balls projected radially inward retainingly engaging said nut and projected radially outward for operative engagement with said tapered inner wall portion, for the purpose of anchoring said nut and tool holder within said body, and whereby forward manual retraction of said sleeve releases said balls facilitating assembly to and manual removal of said tool holder and nut from said body; an external cam surface on said body, and split expansible ring supported within an internal annular slot in said sleeve, adapted on retraction thereof to ride over said cam surface and engaging the same holding said sleeve retracted against its spring bias.

9. In the quick change adapter of claim 1, uniform bore of said body extending throughout its length.

10. A quick change adapter for a power rotated spindle having a bore adapted to receive a tool holder;

a cylindrical body having a uniform axial bore throughout its length mounted upon and secured to said spindle and projecting forwardly thereof;

a forwardly retractable spring biased sleeve movably mounted on said body and including a rearwardly and outwardly tapered inner wall portion;

and an internally threaded nut adapter to threadedly receive said tool holder, projected into said body and bearing against said spindle; its entire outer lateral surface being cylindrical;

there being a series of spaced balls nested in said body portions of said balls projected radially inward retainingly engaging said nut and projected radially outward for operative engagement with said sleeve tapered inner wall portion, the tapered inner wall of the sleeve converging relative to the cylindrical nut surface providing a cooperating wedging and retaining action of the balls between said cylindrical surface of the nut and the sleeve inner wall for the purpose of anchoring and retaining said nut and tool holder within said body and against said spindle, and whereby forward manual retraction of said sleeve releases said balls for radial outward movement facilitating assembly to and manual removal of said tool holder and nut from said body.

* * * * *